United States Patent [19]

Murai et al.

[11] Patent Number: 5,663,780
[45] Date of Patent: Sep. 2, 1997

[54] SPECTACLES WITH DECORATIVE LENS ATTACHING DEVICE

[75] Inventors: Masaru Murai; Isao Hyoi, both of Fukui, Japan

[73] Assignee: Murai Co., Ltd., Fukai, Japan

[21] Appl. No.: 182,002

[22] PCT Filed: Mar. 26, 1993

[86] PCT No.: PCT/JP93/00372

§ 371 Date: Aug. 8, 1994

§ 102(e) Date: Aug. 8, 1994

[30] Foreign Application Priority Data

May 25, 1992 [JP] Japan ..................................... 4-41868

[51] Int. Cl.⁶ ........................... G02C 11/02; G02C 1/04
[52] U.S. Cl. .......................... 351/52; 351/51; 351/103; 351/106
[58] Field of Search ................... 351/51, 52, 103, 351/106, 110, 140, 158; D16/341, 342

[56] References Cited

U.S. PATENT DOCUMENTS

| | | | |
|---|---|---|---|
| 2,960,787 | 11/1960 | Quinones et al. | 351/51 |
| 4,045,131 | 8/1977 | Sherman | 351/52 |
| 4,371,238 | 2/1983 | Lhospice | 351/106 |
| 4,884,883 | 12/1989 | Chappell | 351/52 |
| 4,950,066 | 8/1990 | Hartman | 351/106 |
| 5,024,515 | 6/1991 | Beckemeyer et al. | 351/52 |

FOREIGN PATENT DOCUMENTS

| | | |
|---|---|---|
| 56-170428 | 5/1955 | Japan. |
| 60-68318 | 4/1985 | Japan. |
| 62-197125 | 12/1987 | Japan. |
| 63-80529 | 5/1988 | Japan. |
| 1-43694 | 12/1989 | Japan. |
| 2-34657 | 9/1990 | Japan. |
| 3-45215 | 9/1991 | Japan. |

*Primary Examiner*—Hung X. Dang
*Attorney, Agent, or Firm*—Armstrong, Westerman, Hattori, McLeland & Naughton

[57] ABSTRACT

Spectacles to which a decoration (6) is secured to a predetermined portion of a rim (5) so as not to move. The securing is carried out, for example, by using a linear material (4) which is disposed between the rim (5) and a lens (2).

7 Claims, 13 Drawing Sheets

FIG.12(a)
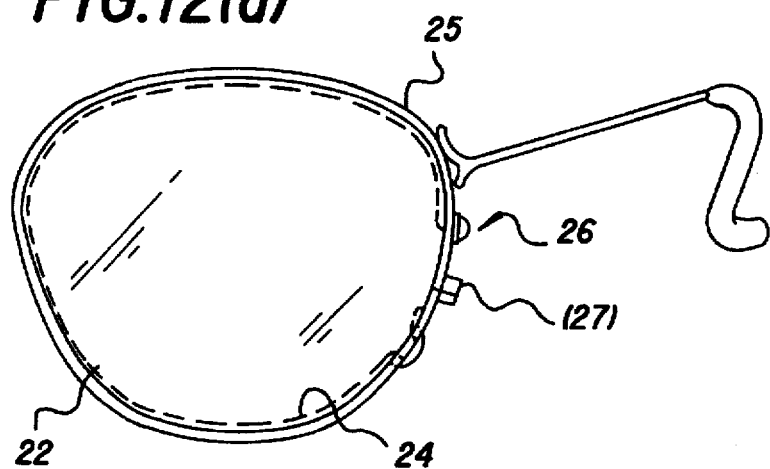
FIG.12(b)
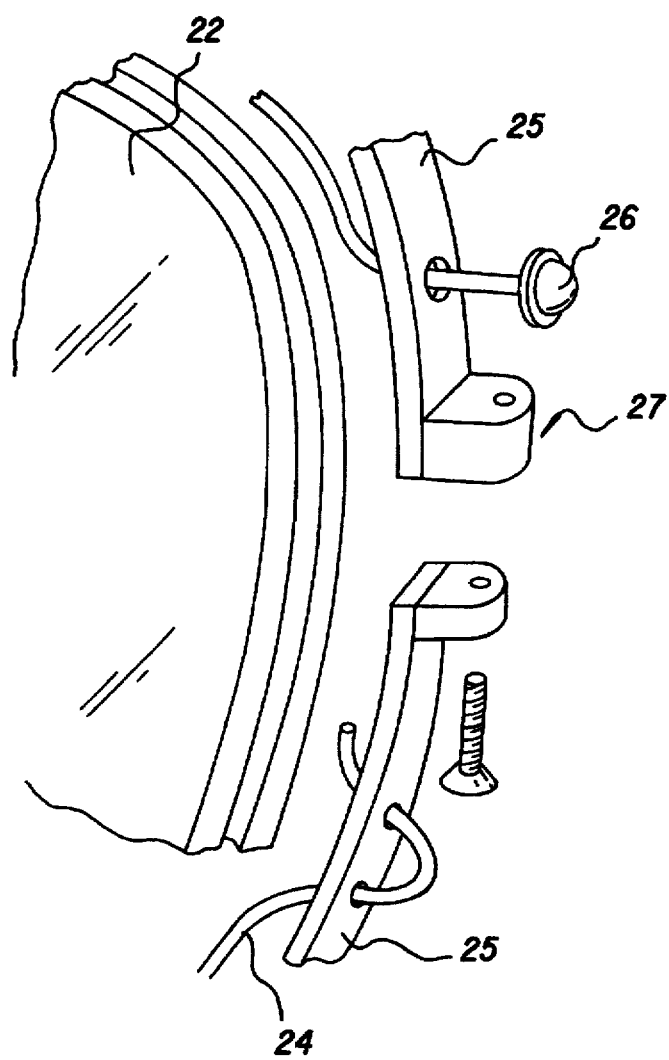
FIG.12(c)
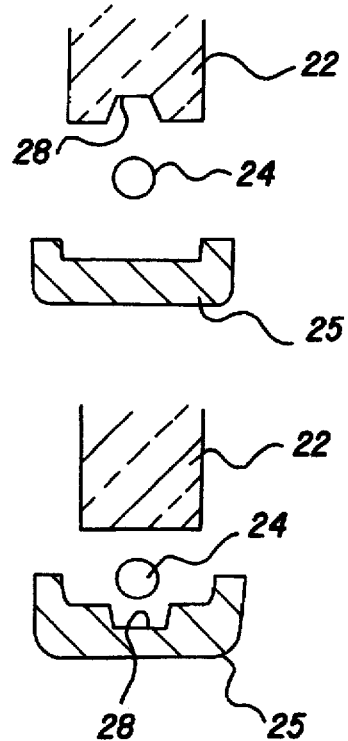
FIG.12(d)

SPECTACLES WITH DECORATIVE LENS ATTACHING DEVICE

TECHNICAL FIELD

The present invention relates to spectacles, and in particular, to spectacles having decorations.

BACKGROUND ART

In the spectacles having rims for supporting the peripheral portions of the lenses, it has been difficult hitherto to secure decorations to the rims because the rims are thin.

The present invention makes it possible to secure decorations to the rims and thereby provides spectacles with decorations having high ornamental effects.

DISCLOSURE OF THE INVENTION

The present invention is characterized by securing a decoration to a rim in spectacles having the rim for fixing lenses.

The decorations are secured to a predetermined portion of the rim so as not to move.

In addition, the securing of the decorations is carried out by using elongated flexible material.

Moreover, the securing of the decorations may be also carried out by soldering, welding or bonding.

Furthermore, the decoration is secured by securing means provided on the rim, and the securing means may comprise a structure having an elastic engaging piece which elastically engages the decoration. Additionally, the decoration can be secured by inserting it between the rim and lenses.

BRIEF DESCRIPTION OF DRAWINGS

FIGS. 12 (a)–(d) are a view showing a full-rim type of spectacles with decorations.

BEST MODE FOR PRACTICE OF THE INVENTION

The present invention will be explained in detail hereunder with reference to the accompanying drawings.

Figure 1A:
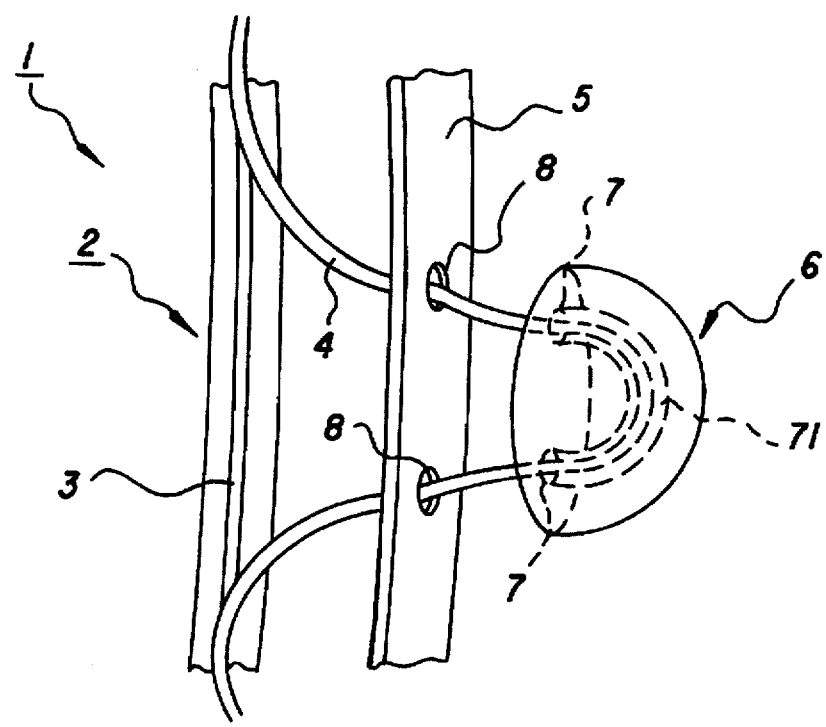
FIG. 1 (a) is a perspective view which shows the condition in which a decoration is secured to spectacles according to a first embodiment of the present invention, FIG. 1 (b) is a perspective view which shows the condition after the securing, and FIG. 1 (c) is a longitudinal sectional view of FIG. 1 (b).
Figure 1B:
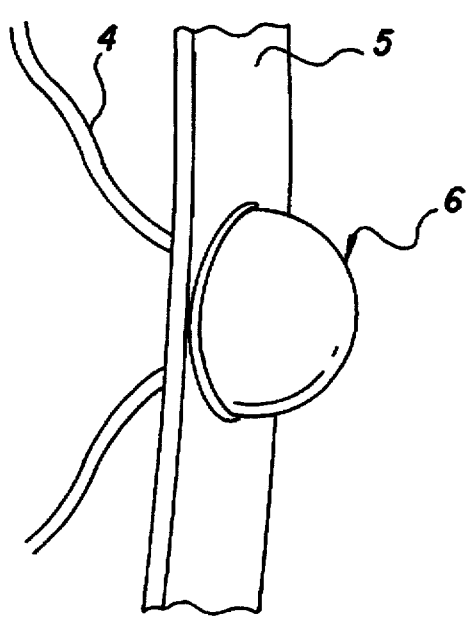
Figure 1C:
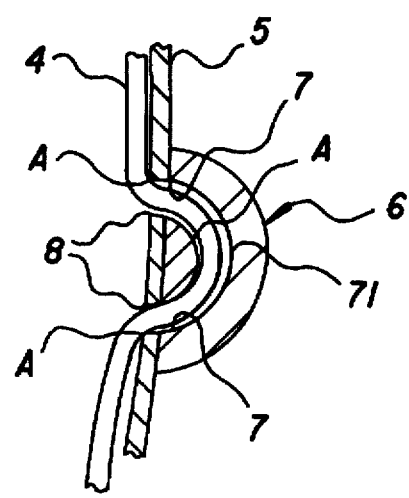
Figure 2A:
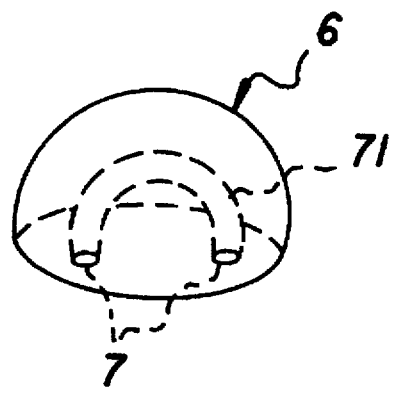
FIG. 2 (a) and 2 (b) are a perspective view showing the decoration in FIG. 1.
Figure 2B:
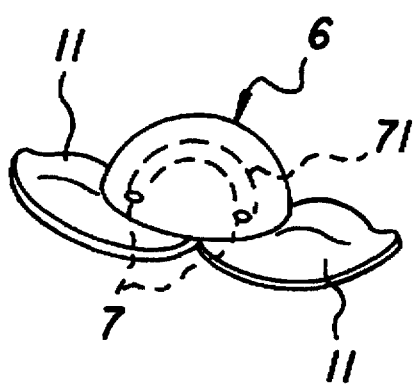

FIG. 1 and FIG. 2 represent a first embodiment, in which spectacles 1 includes lenses 2 fixed to a rim 5 by engaging nylon line or wire 4 as a flexible securing material with and around a groove 3 cut along the periphery of the lens 2.

An object 6 is a decoration to be secured to the rim 5, and the decoration 6 is hemispherical and has two holes 7 at a predetermined interval on the end surface. The holes 7 are communicated with each other via a circular passage 71 in the decoration 6. The form of the passage 71 is not limited to the circular form.

On the other hand, the rim 5 has two holes 8 in a longitudinal direction to be secured to the lens 2 by the nylon line 4, the holes 8 being present in the position to which the decoration 6 is secured and the interval between the holes 8 is almost the same as that between the holes 7 of the decoration 6.

Figure 3:
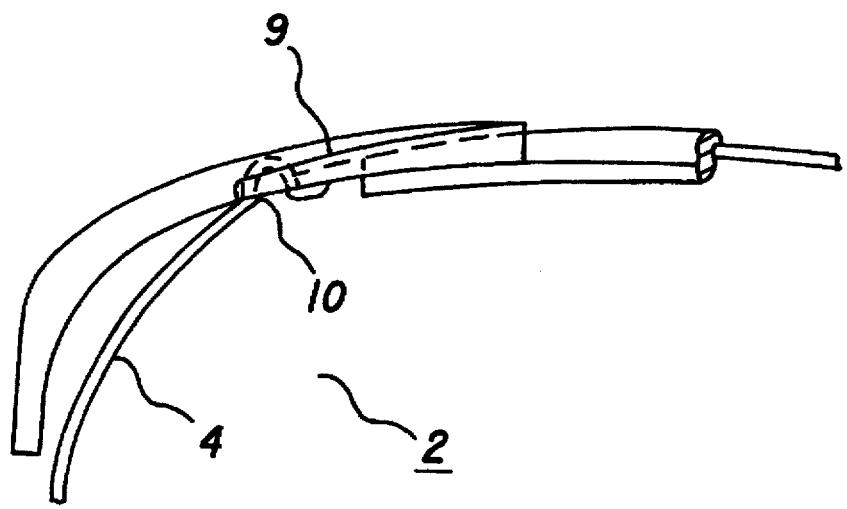
FIG. 3 is a front view which shows the condition in which nylon line is fastened by engaging.

The securing of the decoration 6 to the rim 5 is carried out, as shown in FIG. 1, by passing the nylon line 4 through one hole 8 of the rim 5, then inserting the nylon line 4 to one hole 7 of the decoration 6, drawing out the line 4 from the other hole 7 via the passage 71 and passing the line through the other hole 8 of the rim 5. Thereafter, as shown in FIG. 3, the one end of the nylon line 4 is made hook-shaped, and engaged with and fixed to an engaging portion 10 of the outer end portion of a rim-bar 9 provided along the upper portion of the lens 2, so that the rim 5 is fastened to the lens 2 and the lens 2 is supported to the rim 5.

In the spectacles having the above structure, since the decoration 6 is secured by using the nylon line 4 for fixing the lens 2, the fixing operation of the lens 2 and the securing operation of the decoration 6 can be carried out simultaneously so that the number of the operation steps for manufacturing spectacles can be reduced.

Furthermore, since the decoration 6 is secured to the rim 5 by using the nylon line 4, a portion of the nylon line 4 for fastening the rim 5, which is uncovered in conventional spectacles, can be covered by the decoration 6, so that the design appears to be neat.

Moreover, since the nylon line 4 is passed along the periphery of the lens 2 via the holes 8 of the rim 5, the holes 7 of the decoration 6 and the passage 71 to fix the lens 2 to the rim 5, the bending angle of the nylon line 4 is increased in comparison with the prior art (cf. FIG. 12 (b)), as shown in FIG. 1 (c), so that the frictional force at the portion A where the nylon line 4 is contacted is increased and the possibility of the slippage of the nylon line 4 is made small. For this reason, the lens fixing strength can be improved.

The decoration 6 can be provided with a pair of leaves 11, as shown in FIG. 2 (b).

Figure 4:
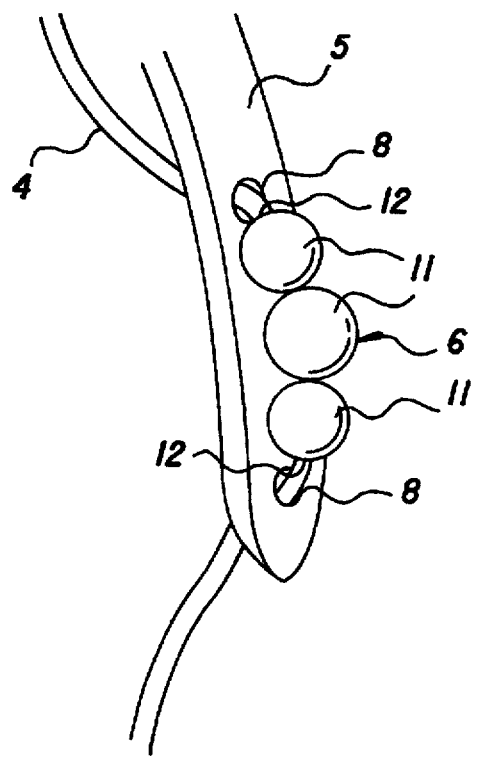
FIG. 4 is a perspective view of a portion to which a decoration is secured according to a second embodiment of the present invention.

FIG. 4 shows a second embodiment, and in this embodiment, the decoration 6 is in a beading form in which three beads 11 are arranged, the beads 11 having perforations 12, and being secured to the rim 5 by passing the nylon line 4 through the perforations 12. The other structure and operation of this second embodiment are substantially the same as those of the first embodiment, so the like reference numerals are added to portions corresponding to those of the first embodiment and the explanation thereof is now omitted.

Figure 5A:
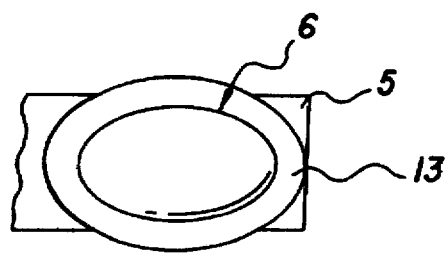
FIG. 5 (a) is a side view of the portion to which a decoration is secured according to a third embodiment of the present invention, and FIG. 5 (b) is a longitudinal sectional view of FIG. 5 (a).
Figure 5B:
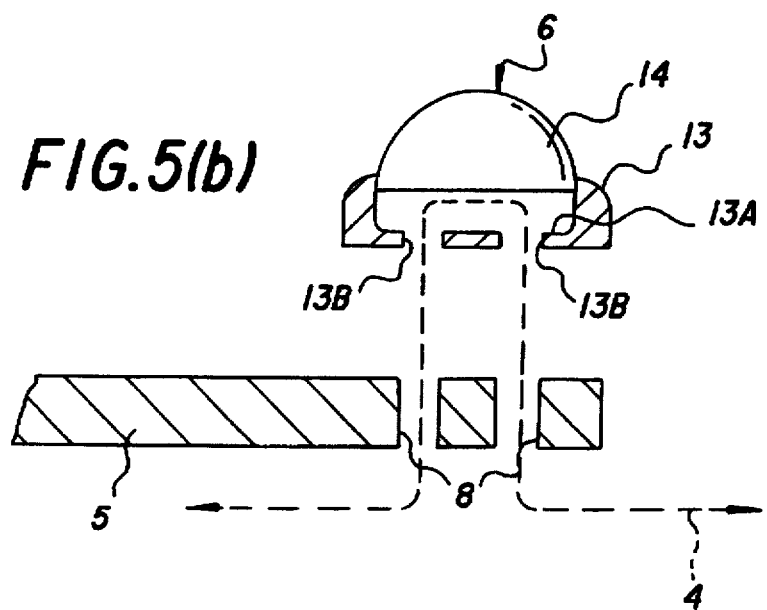

FIG. 5 shows a third embodiment, and in this embodiment, the decoration 6 has a securing base 13, the sectional view of the securing base 13 being in a form of a concave body and the closing portion 13A having two openings 13B at a predetermined interval. A stone 14 which is oval, if it is seen from the front, and the sectional view of which is circular, is mounted in the securing base 13 with a space corresponding to the diameter of the nylon line 4. The stone 14 is not limited to the described form.

The securing of the decoration 6 with the securing base 13 to the rim 5 is carried out by passing the nylon line 4 through one hole 8 of the rim 5, then putting it to one opening 13B of the securing base 13, passing it through the space between the stone 14 and the securing base 13, drawing it out from the other opening 13B and then passing it through the other hole 8 of the rim 5. The other structure and operation of this third embodiment are substantially the same as those in the first embodiment, so the like reference numerals are added to portions corresponding to those of the first embodiment and the explanation thereof is now omitted.

Figure 6A:
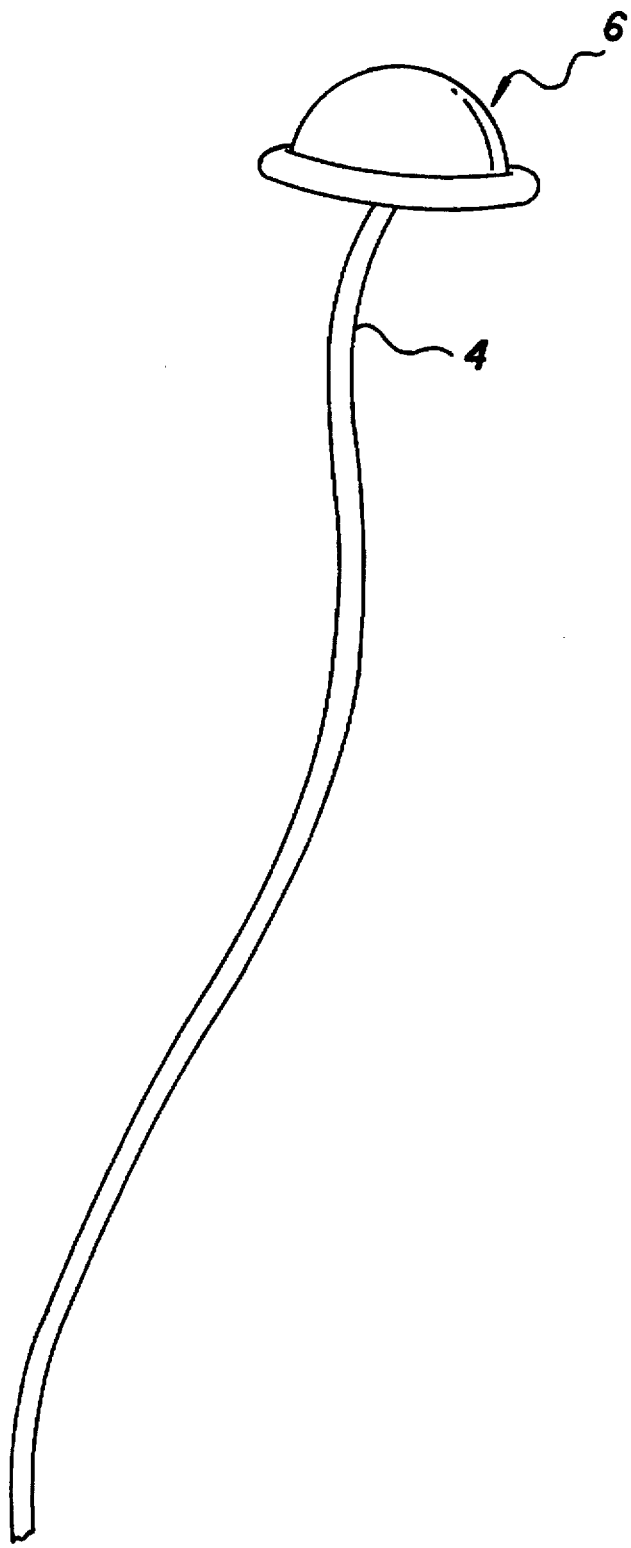
FIG. 6 (a) is a perspective view of a decoration of spectacles according to a fourth embodiment of the present invention, and FIGS. 6 (b) and 6 (c) are longitudinal sectional views showing the structures for fixing nylon line to a decoration.
Figure 6B:
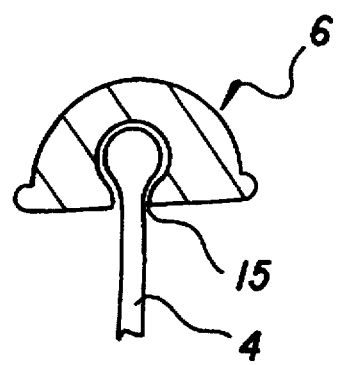
Figure 6C:
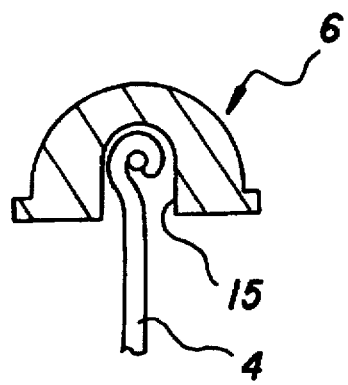
Figure 7A:
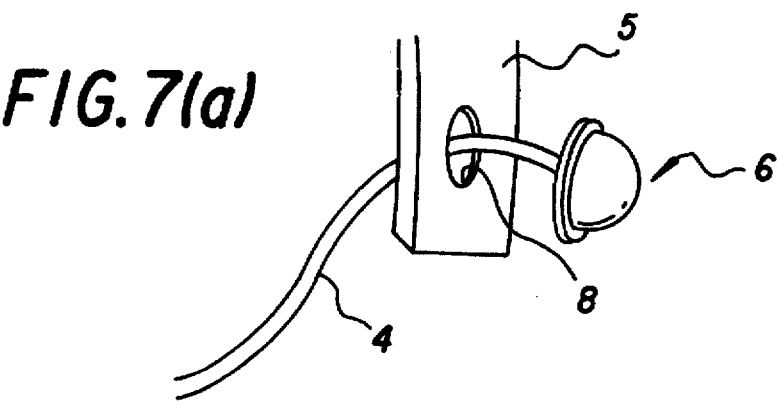
FIG. 7 (a) is a perspective view showing the condition in which the decoration in FIG. 6 is secured, FIG. 7 (b) is a perspective view showing the spectacles after the securing, and FIG. 7 (c) is a longitudinal sectional view of the portion to which the decoration of FIG. 7 (b) is secured.
Figure 7B:
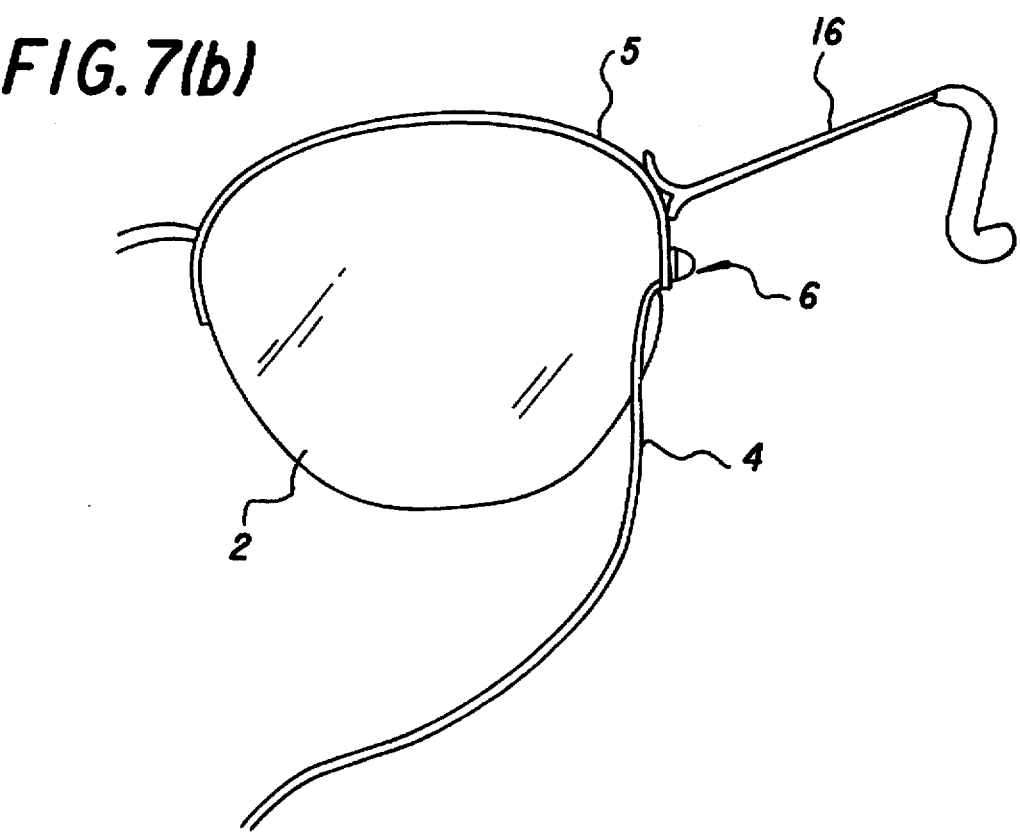
Figure 7C:
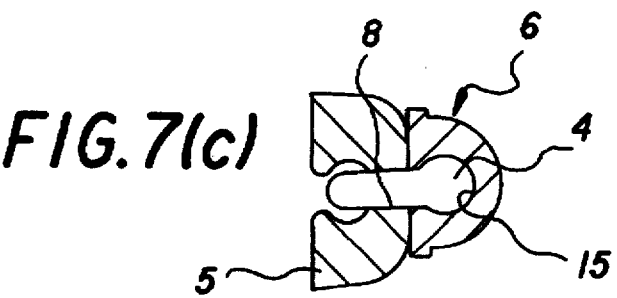

FIG. 6 and FIG. 7 represent a fourth embodiment, and in this embodiment, the decoration 6 is hemispherical and has a flange and one hole 15 at substantially the central portion of the end surface of the decoration 6, so that the decoration 6 is secured by inserting the one end of the nylon line 4 into the hole 15. FIG. 6 (b) shows the decoration 6 in which the nylon line 4 having the enlarged end is inserted into and fixed to the hole 15, and FIG. 6 (c) shows the decoration 6 where the hook-shaped end of the nylon line 4 is engaged with, and fixed to, an engaging portion 15A in the hole 15.

On the other hand, the rim 5 has one hole 8 at a position for securing the decoration 6, as shown in FIG. 7 (a).

The securing of the decoration 6 to the rim 5 is carried out by only passing the other end of the nylon line 4 through the hole 8 of the rim 5, as shown in FIG. 7. Thereafter, the nylon line 4 is passed along the periphery of the lens 2, engaged and secured on the side of the bridge, as described in the first embodiment, so that the rim 5 is fastened to the lens 2 and the lens 2 is supported to the rim 5. The adjustment of the length of the nylon line 4 is carried out on the side of the bridge.

According to such structure, a fastening portion of the rim 5 by the nylon line 4 is covered with the decoration 6 so that the design becomes simple.

Furthermore, since the rim 5 is formed with only one hole 8, the strength of the rim 5 can be improved. Moreover, since the number of the hole 8 is one, the probability that the nylon line 4 is broken is made small, making it difficult to break the nylon line 4, in comparison with the case where the nylon line 4 is passed through two holes 8.

Since the rim 5 is formed with one hole, the steps of the manufacture thereof are reduced in comparison with the case where two holes are formed. Thereby, the cost can be reduced.

Furthermore, the construction in a retail shop becomes easy.

Figure 8A:
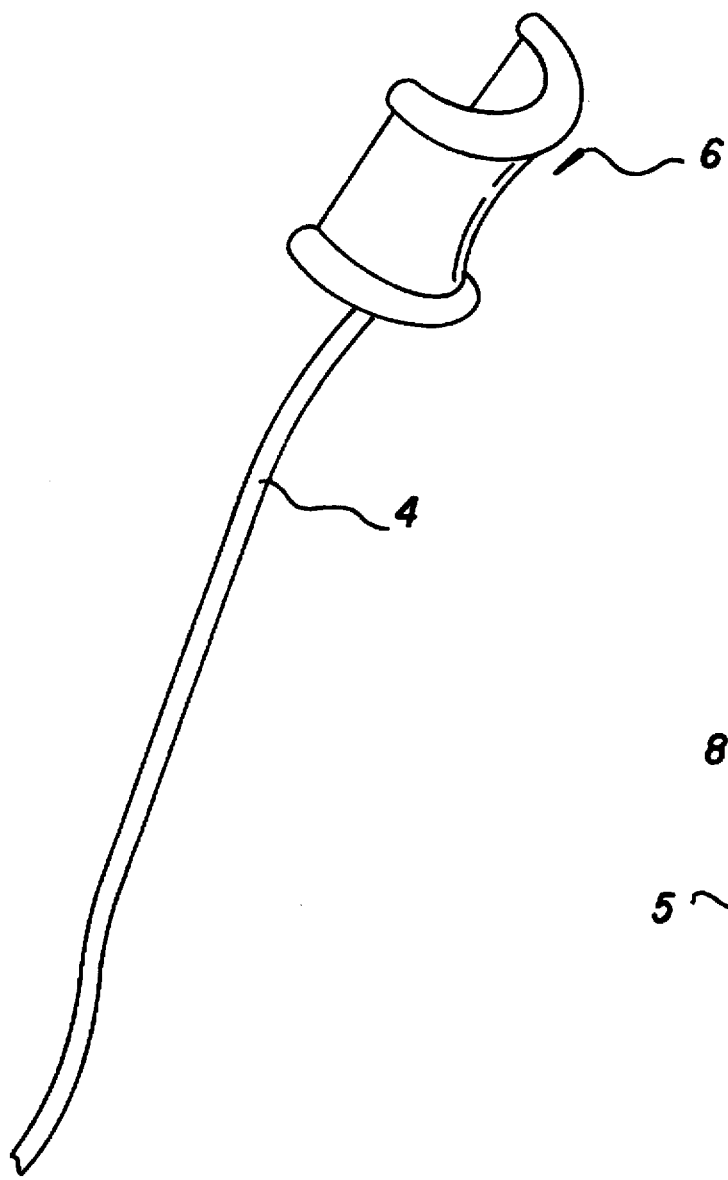
FIG. 8 (a) is a perspective view showing another decoration according to the fourth example, and FIG. 8 (b) is a longitudinal sectional view showing the condition where the decoration of FIG. 8 (a) is secured.
Figure 8B:
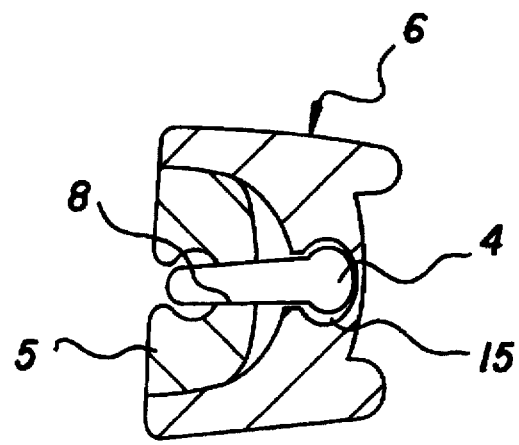

In this embodiment, there may be adapted a decoration 6 of the type having a longitudinally cut half cylindrical shape which is capable of surrounding the rim 5, as shown in FIG. 8.

Figure 9A:
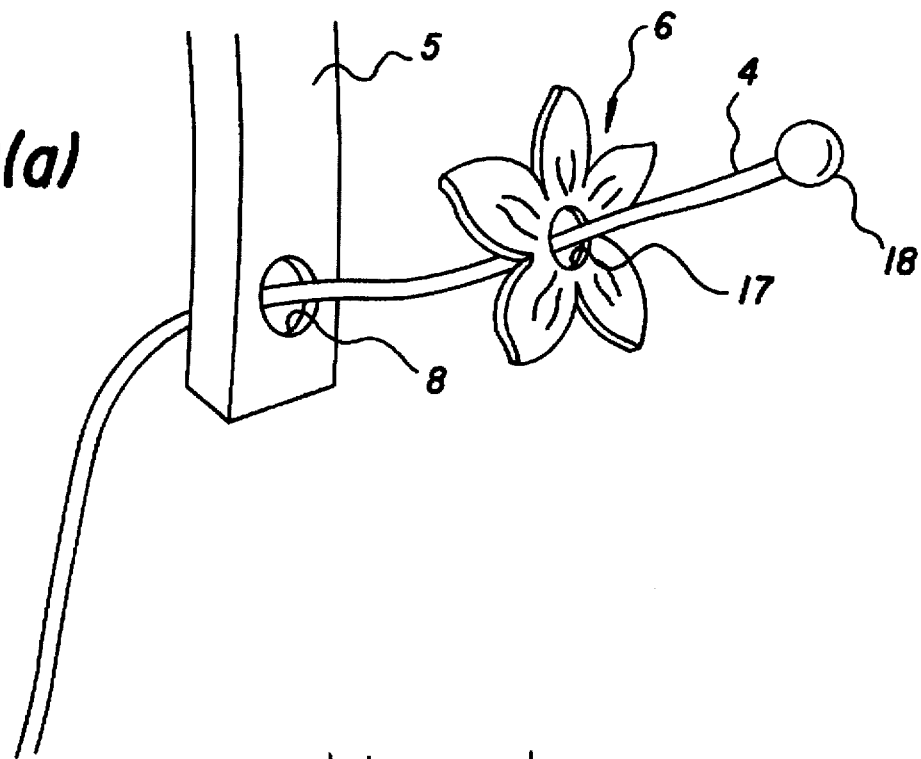
FIG. 9 (a) is an essential perspective view showing the condition where the decoration is secured to spectacles according to a fifth embodiment of the present invention, FIG. 9 (b) is an essential perspective view showing after securing, and FIG. 9 (c) is a side view of the decoration.
Figure 9B:
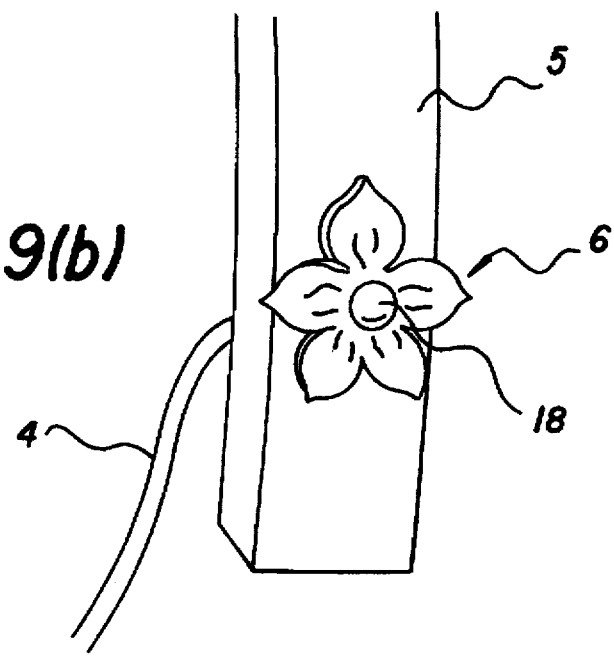
Figure 9C:
Figure 10A:
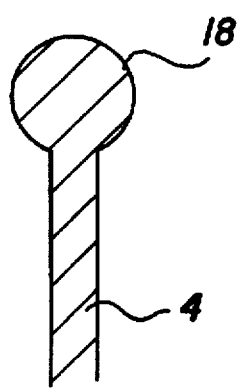
FIG. 10 (a) is a longitudinal sectional view of a decoration of spectacles according to a sixth embodiment of the present invention, FIG. 10 (b) is a longitudinal sectional view of a securing base, FIG. 10 (c) is a longitudinal sectional view showing the condition where the decoration is secured, FIG. 10 (d) is a side view after the securing, and FIG. 10 (e) is a side view after the securing using a securing base different from that shown in FIG. 10 (b).
Figure 10B:
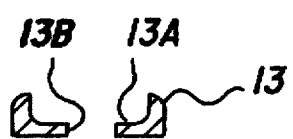
Figure 10C:
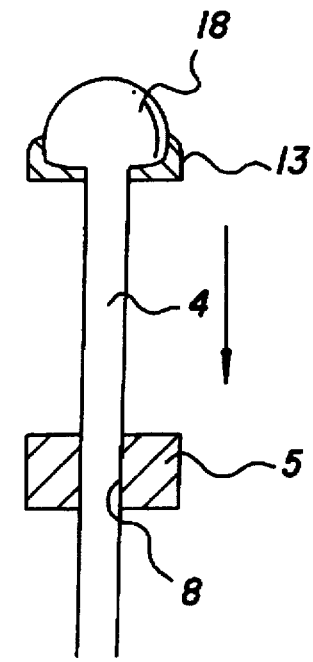
Figure 10D:
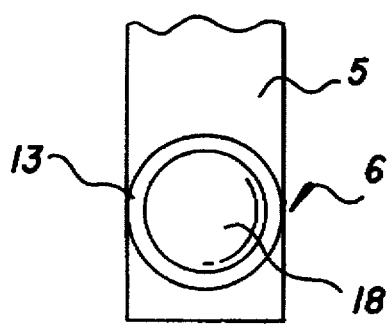
Figure 10E:
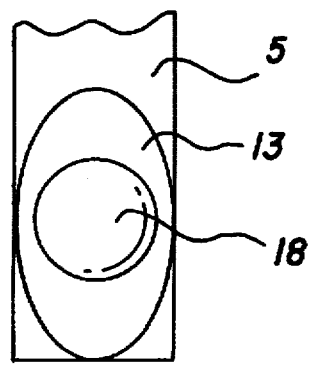
Figure 11A:
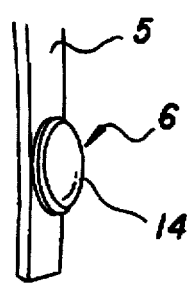
FIG. 11 (a)–(l) are partial perspective views showing examples of decorations for spectacles according to embodiments of the present invention.
Figure 11B:
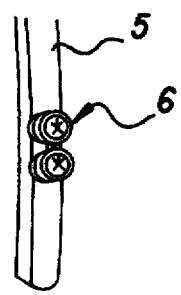
Figure 11C:
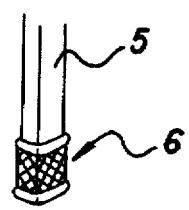
Figure 11D:
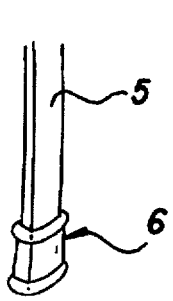
Figure 11E:
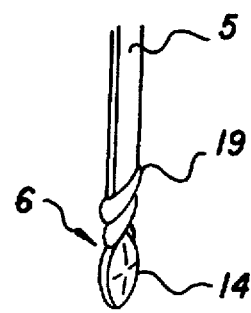
Figure 11F:
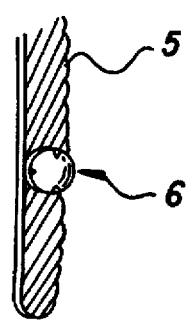
Figure 11G:
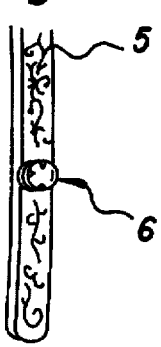
Figure 11H:
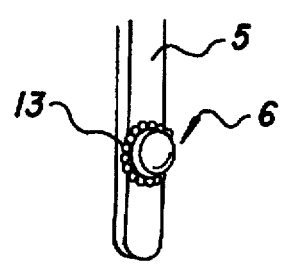
Figure 11I:
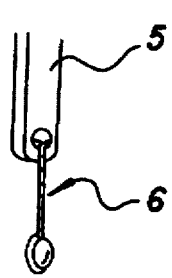
Figure 11J:
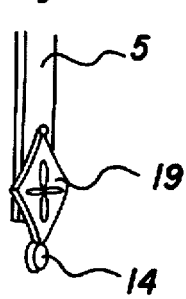
Figure 11K:
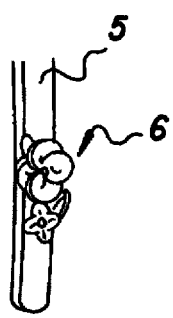
Figure 11L:
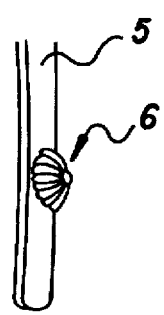

FIG. 9 shows a fifth embodiment, which is similar to the fourth embodiment, except that the decoration 6 is a metal ornament in a form of flower petals and has an opening 17 at substantially the central portion thereof. The nylon line 4 has a ball 18 at its one end which is formed by heating, etc., and the other end of the nylon line 4 is passed through the opening 17 of the decoration 6 and the hole 8 of the rim 5, so that the decoration is engaged with the rim 5 by the ball 18 of the nylon line 4.

The decoration 6 of a metal ornament in a form of petals provides somewhat three-dimensional appearance so as to cover the ball 18 of the nylon line 4. The nylon line 4 may have a projection instead of the ball 18.

The securing of various metal ornaments of such a flower motif, etc. enriches the simple design. The other structure and operation are substantially the same as those in the fourth embodiment, so that the like reference numerals are added to portions corresponding to those of the fourth embodiment and the explanation thereof is now omitted.

FIG. 10 shows the sixth embodiment, and in this embodiment, the nylon line 4 having a ball 18 shown in the fifth embodiment is processed by heating, etc. to make the round ball 18, and the round ball 18 used as it is as a decoration 6, and to the securing base 13 shown in the third embodiment, the opening 13B is formed at substantially the central portion of a closing portion 13A, and the round ball 18 as a decoration 6 is secured via the opening 13B. The round ball 18 may be colored.

FIG. 11 shows a number of examples of the decoration 6 according to the aforementioned embodiments. FIG. 11 (a) shows a decoration comprising a stone 14, the sectional view of which is oval. FIG. 11 (b) shows a decoration comprising the plural number of precious stones. FIGS. 11 (c) and (d) show decorations which cover the end of the rim 5, and according to such structure, the decoration is secured to the end, that is, the cut end, so that a danger is prevented and the design is enriched. FIG. 11 (c) shows a decoration of metal having a patterned surface, and FIG. 11 (d) shows a decoration having a seven treasures. FIG. 11 (e) shows a decoration in which a stone 14 is suspended to a base 19 which is attached to the rim 5, and, since the decoration is secured to the end, a danger is prevented and the design is enriched, similar to the decorations in FIGS. 11 (c) and (d). FIG. 11 (f) shows a decoration secured to the ornamental rim 5. FIG. 11 (g) shows a decoration secured to the metal-carved rim 5. FIG. 11 (h) shows a decoration having an ornamental securing base 13. FIG. 11 (i) shows a decoration with chain. FIG. 11 (j) shows the decoration of FIG. 11 (e) in which the base 19 is metal-ornamental, and FIGS. 11 (k) and (l) show decorations 6 of metal which have such size as protruding from the rim 5 and are three-dimensional.

In the above examples, the securing by using the nylon line 4 as a flexible securing material is explained as an example, but the metal wire can be used if the wire is flexible. The securing, where a flexible securing material is passed along the groove formed in the lens 2 to secure the lens 2, is explained as an example, but it is possible to form a groove in a bendable securing material in a wide form and to insert the lens into the groove and fix the lens.

FIG. 12 represents a seventh embodiment of the present invention.

In this embodiment, a decoration 26 is secured to the rim 25 of a full-rim type of spectacles by using a nylon line 24.

In this embodiment, the nylon line 24 is placed between a rim 25 and a lens 22 and extends round the lens, and the decoration 26 is secured to the securing end portion of the nylon 24. The both ends thereof are placed at a connecting end portion 27 of the rim 25, but can be placed at any position.

Furthermore, any elongated material can be applied if it has a strength necessary for the securing, instead of the nylon line 26.

If a soft material is used, an interference between the lens 22 and the rim 25 can be prevented and the breaking of the lens 22, etc. can be prevented.

Since the nylon line 24 is placed between the lens 22 and the rim 25, a groove 28 into which the nylon line 24 is inserted may be formed on the periphery of the lens 22, as shown in FIG. 12 (c), or a groove 28 may be formed on the inside of the rim 25, as shown in FIG. 12 (d). If the sectional form of the nylon line 24 is flat and thin, it is not necessary to form the groove 28.

Figure 13A:
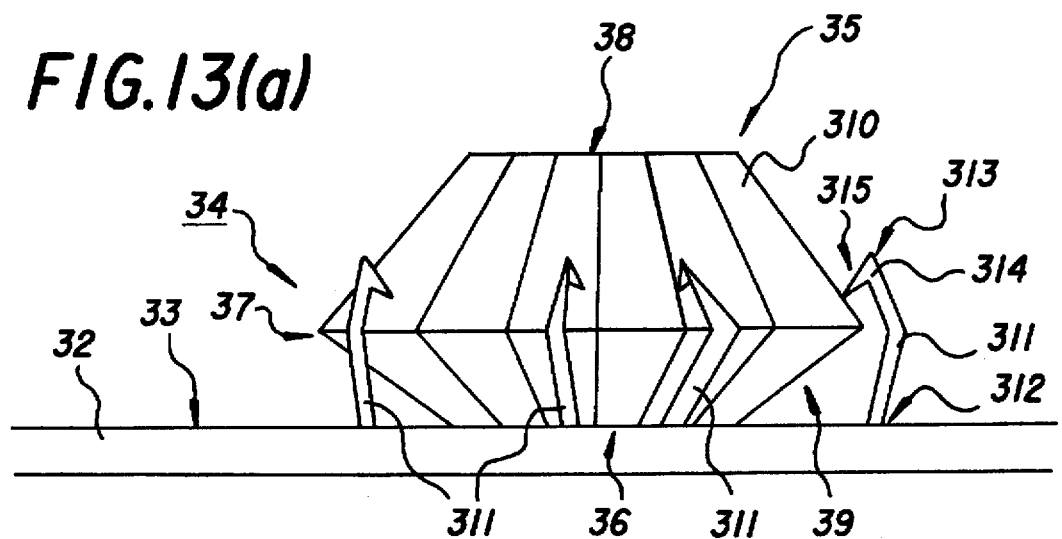
FIG. 13 (a) is a front view showing an essential portion of the spectacle frame with the front surface of the front being directed upward, and the FIG. 13 (b) is a view showing an essential portion of the spectacle frame with the front surface of the front being directed upward.
Figure 13B:
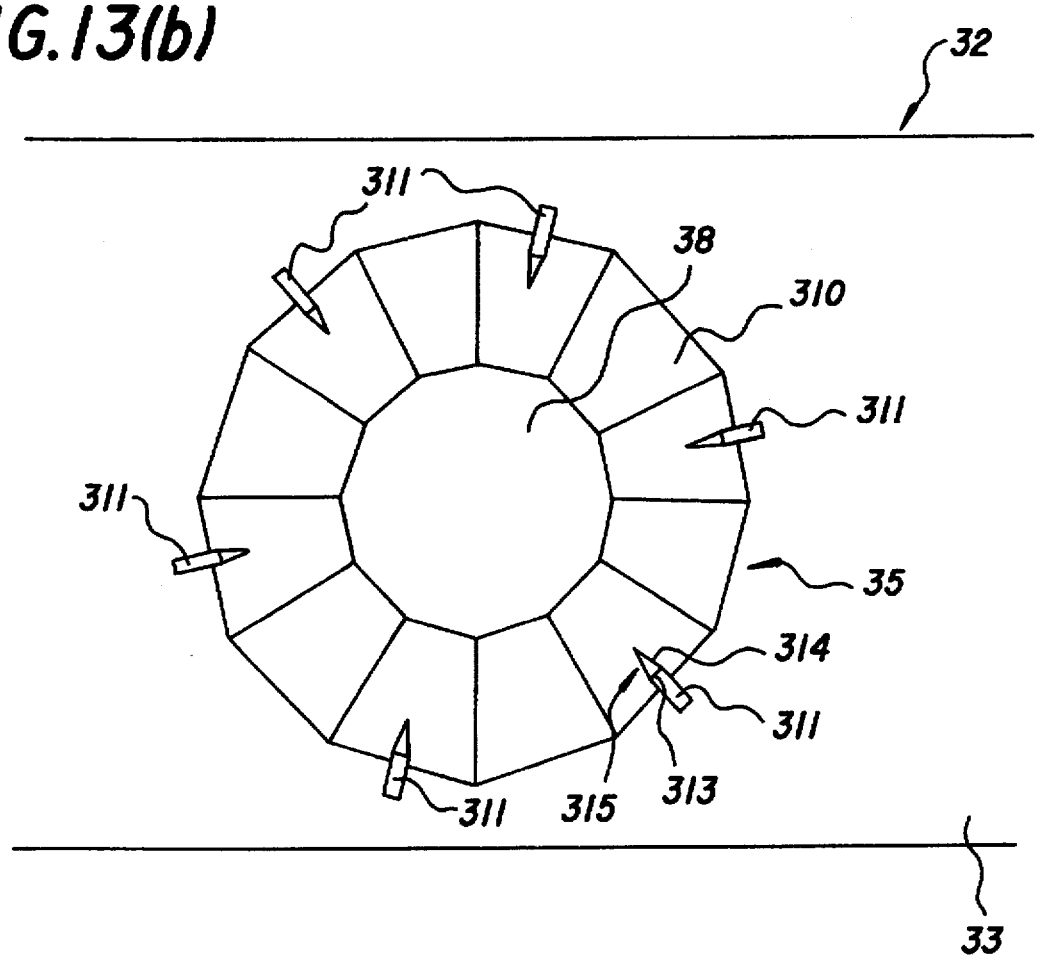
Figure 14:
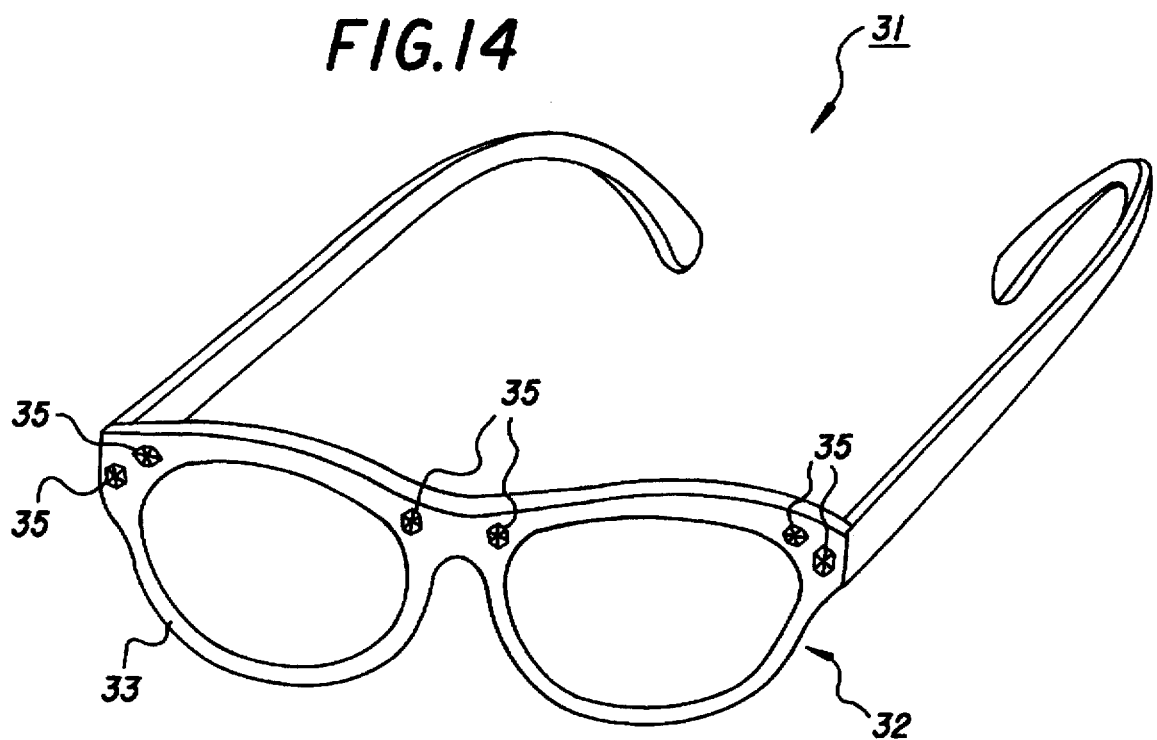
FIG. 14 is a schematic perspective view of the spectacle frame of FIG. 13.
Figure 15:
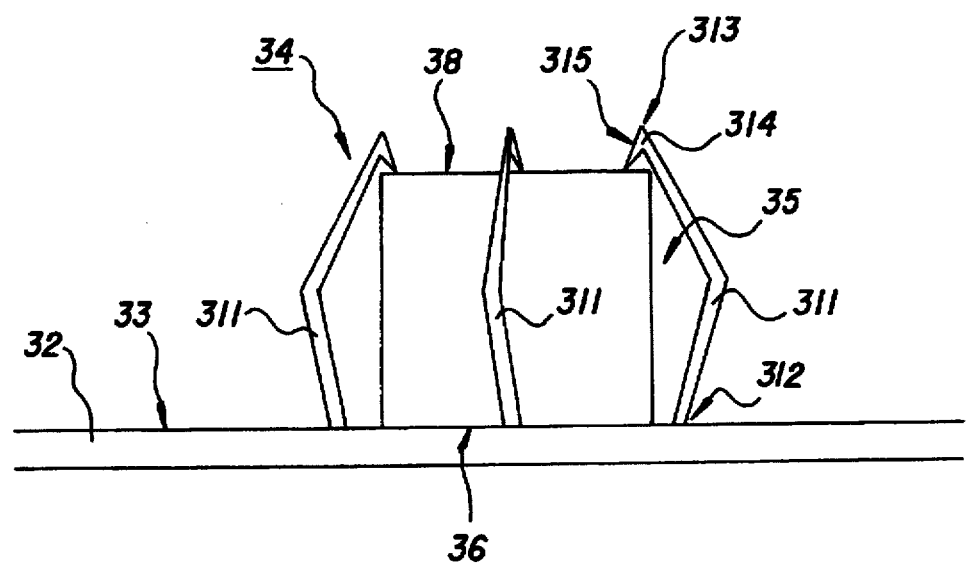
FIG. 15 is a front view showing an essential portion of the spectacle frame to which another precious stone is secured, with the front surface of the front being directed upward.
Figure 16A:
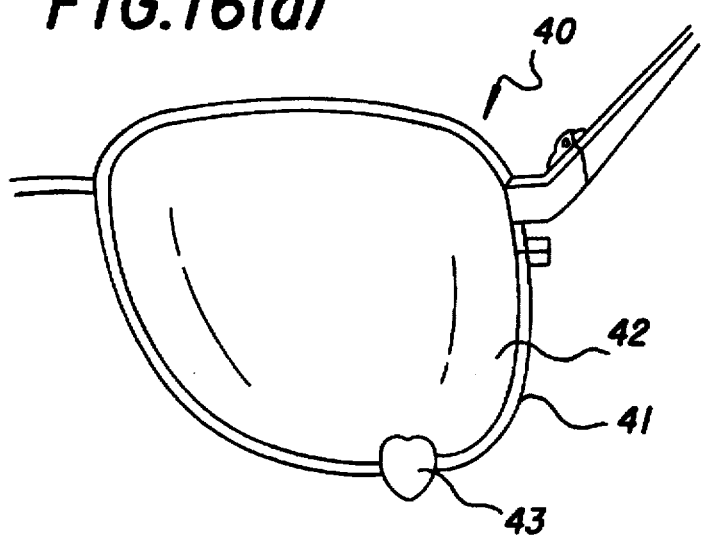
FIG. 16 (a)–(g) are a view showing an embodiment where a decoration is secured by inserting it between a rim and a lens.
Figure 16B:
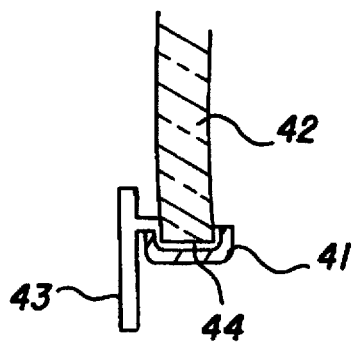
Figure 16C:
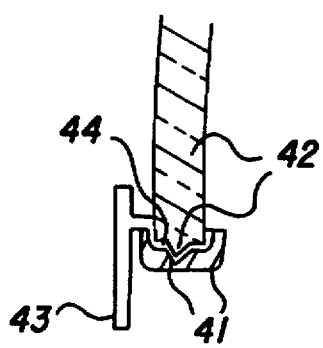
Figure 16D:
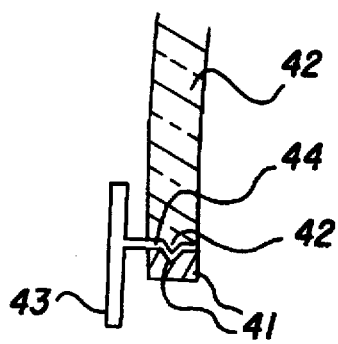
Figure 16E:
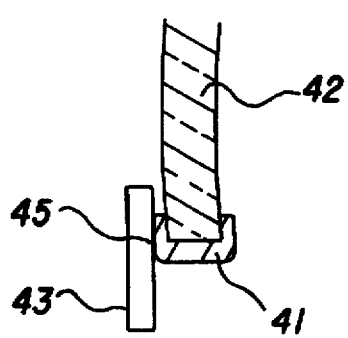
Figure 16F:
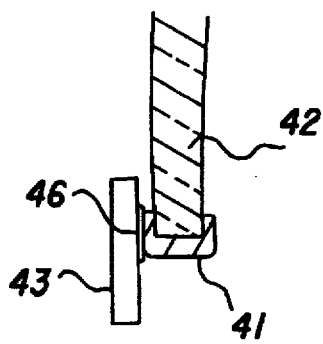
Figure 16G:
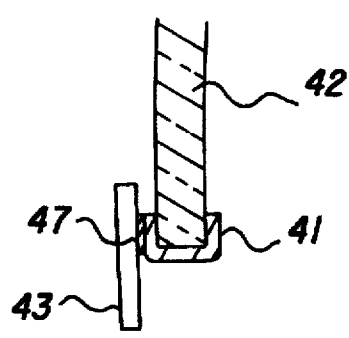

FIG. 13 and FIG. 14 represents an eighth embodiment of the present invention.

In these figures, a securing means 34 for securing a precious stone as a decoration to a front surface 33 of a front rim 32 of a frame 31 of the spectacles and a precious stone 35 secured by the securing means 4 are shown.

The shape of the precious stone 35 will be explained, with the front surface 33 of the front 32 to which the precious stone 35 is secured being directed upward (cf. FIG. 13 (a)).

A base 36 of the precious stone 5 which abuts against the front surface 33 of the front rim is provided with a regular dodecagon shape. The stone has a taper form widening upward from the sides of the regular dodecagon from the base 36 up to the certain height position referred to as a bent position 37 and has a taper form narrowing from the bent position 37 up to an upper surface 38 of the precious stone 35. The outer side surface of the precious stone 35 from the position where the precious stone 35 abuts against the front surface 33 of the front up to the bent position 37 is referred to as a lower side surface 39, and the outer surface from the bent position 37 up to the upper surface of the precious stone 35 is referred to as an upper side surface 10.

Next, the securing means 34 will be explained. The material of the securing means 34 is a material having the rigidity capable of inserting the precious stone 35 and securing the precious stone 35 after inserting.

The securing means 34 comprises six claws 311, and the claws 311 are attached to the front surface 33 of the front by means of soldering so as to be along the contour of the precious stone 35 with equal intervals. Next, the shape of the catches 311 will be explained, with the front surface 33 of the front being directed upward (cf. FIG. 13 (a)). The claw 311 has a taper form widening along the lower side surface 39 of the precious stone 35 from the attached portion 312 where the claw 311 is attached to the front 32 up to about the height of the bent position 37 of the precious stone 35, and a taper form narrowing along the upper side surface 310 of the precious stone 35 from about the bent position 37 up to the top portion 313 where the claw 311 is positioned highest. The claw 311 has a sharp supporting portion 314 in a taper form narrowing toward the lower part from the top portion 313 of the claw 311, and the supporting portion part 314 reaches the position where the supporting portion 314 abuts against the upper side surface 310 of the precious stone 5. The upper surface of the supporting portion 314 in a taper form of the claw 311 is a guide surface 315 which acts as a guide for inserting the precious stone 35.

The periphery of the opening formed by the top portions 313 of the claws 311 is smaller than the periphery of the precious stone 35 at the bent position 37.

In the spectacles having the above-described structure, when the precious stone 35 is inserted into the securing means 34, the lower side surface 39 of the precious stone 35 is first abutted against the guide surface 315 of the securing means 34, so that the precious stone 35 is mounted on the securing means 34. The precious stone 35 is then pressed from the upside, so that the precious stone 35 is guided down into the condition in which the guide surfaces 315 of the securing means 34 and the lower side surface 39 of the precious stone 35 in a taper form are suitably contacted. Then, while the lower surface 39 of the precious stone 35 in a taper form widening upward is pressed down, the guide surfaces 315 widening upward which abuts against it are widened by pressure toward the outside with being subjected to the elasticity toward the inside by the rigidity of the securing means 34. Thus, the precious stone 35 is inserted into the securing means 34. Then, when the periphery of the bent position 37 of the precious stone 35 accords with the periphery formed by each of the top portions 313 of the claw of the securing means, the securing means 34 is in a condition of being most widened toward the outside. Then, the precious stone 35 is further pressed down from this condition, the pointed ends of the supporting parts 314 of the securing means 34 abut against the upper side surface 310 of the precious stone 35. Since the upper side surface 310 of the precious stone 35 is in a form of narrowing upward, the securing means 34 rapidly returns to the inside by the rigidity, so that the upper side surface 310 of the precious stone 35 is guided in a condition where it is contacted to the pointed end of the supporting portion 314 and the base 36 of the precious stone 35 is come down to the position where it abuts against the front surface 33 of the front 32 and then stopped. At this time, the securing means 34 returns to the initial condition by the rigidity, and the pointed ends of the supporting part 314 of the securing means 34 abuts against the upper side surface 310 of the precious stone by its elasticity toward the inside so that the precious stone 35 is firmly secured.

In the spectacles having such structure described above, the precious stone 35 can be easily secured to the frame 31 of the spectacles only by inserting it to the securing means 34 without processing such as cutting, etc. of the precious stone 35. Additionally, once it is inserted, the supporting portions 314 of the securing means 34 strongly secures it by its elasticity so that the precious stone 35 can be prevented from falling off.

Furthermore, a precious stone having various forms or sizes can be secured by changing the height of the claw 311 of the securing means 34, the angle of the tapering portion of the claw 311, or the angle of the guide surface 315 of the supporting portion 314 of the securing means 34. For example, when the precious stone 35 is in a form of a column, it is advisable to adjust the height of the securing means 34 so that the pointed ends of the supporting parts 314 of the securing means 34 abut against the upper surface 38 of the precious stone 35.

In the above-described embodiment, since the precious stone the side surface of which has a dodecagonal shape is used, six claws are provided so that the supporting portions 314 abut against the surface 312 every other surface, but the number thereof is not limited as far as the supporting portions 314 abut against at least three points of the side surface of the precious stone 35. In order to completely prevent it from being shaken or falling off, it is desirable that the number is increased to some degree. Furthermore, in order to improve a sense of beauty, it is desirable to decide the number so that the arrangement of the claws is symmetrical.

Moreover, in the above-described embodiment, the securing means 34 is provided to the front 32 of the frame of the spectacles, but it is possible to attach them at any position if there is on the outer side surface of the frame of the spectacles.

Furthermore, when a larger precious stone is secured, it is advisable to form a concave portion in the frame, into which the base to the precious stone is fitted, in order to completely prevent it from being shaken.

Furthermore, in the above-described embodiment, the precious stone is used as a decoration, but it is not limited to the precious stone, so that it is possible to secure other accessories.

Moreover, in the above-described embodiment, the securing means 34 is attached to the frame 31 of the spectacles by soldering, but if the securing means 34 and the frame 31 of the spectacles are monolithically formed, the manufacturing steps can be simplified, a trouble for manufacturing can be saved and the manufacturing cost becomes decreased.

FIG. 16 represents a ninth embodiment of the present invention.

The figure shows securing of a decoration 43 to the rim of the full-rim type of spectacles 40 so as to insert the decoration 43 between the rim 41 and the lens 42.

For example, as shown in FIG. 16 (b), an inserting portion 44 monolithically formed to the decoration 43 is inserted between the rim 41 and the lens 42, and the rim is clamped to secure the decoration. The rim 41 can be formed so as to provide a groove 41a corresponding to a projection 42a formed on the periphery of the lens 42, as shown in FIGS. 16 (c) and (d).

Furthermore, the decoration 43 may be secured by soldering 45, welding 46, adhesion 47, etc., as shown in FIG. 16 (e), (f), (g).

INDUSTRIAL APPLICABILITY

As described above, the spectacles with decorations according to the present invention is useful for adjusting visual acuity or as sunglasses, and in particular, has an easy securing and is suitable to improve the ornamental effects.

We claim:

1. Spectacles comprising a pair of lenses, a spectacle frame body having rigid rim portions containing opposed interior and exterior surfaces, each of the lenses being disposed along one portion thereof against a cooperating portion of the rim portions, a flexible lens holding member extending under tension around another portion of each of the lenses for securing each of the lenses to the frame body portions, hole means formed in the spectacle frame body for passing an associated flexible lens holding member, at least one end of the associated flexible lens holding member defining a terminal fastening portion thereof, and a decorative member containing a concealed interior passage receiving the terminal fastening portion of the lens holding member for securing the decorative member in an exposed position to the exterior surface of the frame body.

2. Spectacles according to claim 1, wherein said hole means comprises a pair of adjacent holes and the terminal fastening portion of the flexible lens holding member passes through the holes to form a loop disposed adjacent the exterior surface of the rim portion between the holes, and said decorative member contains a U-shaped passage and a pair of holes defining the respective ends of said passage, said holes facing the holes of the rim portion to receive the terminal fastening portion of the flexible lens holding member and conceal the loop formed therein.

3. Spectacles according to claim 2, including a plurality of decorative members, each provided with through-holes respectively through which the loop portion of the flexible lens holding member extends.

4. Spectacles according to claim 1, wherein the terminal fastening portion comprises an end portion of the flexible lens holding member, said hole means comprises a single hole formed in the rim portion, and the flexible lens holding member passes through the hole from the interior surface of said frame body to the exterior side thereof.

5. Spectacles according to claim 4, wherein said flexible lens holding member includes engaging means retained by the decorative member.

6. Spectacles according to claim 5, wherein said engaging means is exposed outside of the decorative member.

7. Spectacles according to claim 6, wherein the exposed portion of the engaging means constitutes a portion of the decorative member.

* * * * *